United States Patent
Silverbrook et al.

(10) Patent No.: US 7,063,408 B2
(45) Date of Patent: Jun. 20, 2006

(54) PRINT MEDIA AND INK SUPPLY CARTRIDGE

(75) Inventors: Kia Silverbrook, Balmain (AU); Tobin Allen King, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 120 days.

(21) Appl. No.: 10/982,772

(22) Filed: Nov. 8, 2004

(65) Prior Publication Data

US 2005/0068393 A1    Mar. 31, 2005

Related U.S. Application Data

(63) Continuation of application No. 10/713,058, filed on Nov. 17, 2003, which is a continuation of application No. 09/436,508, filed on Nov. 9, 1999, now Pat. No. 6,626,529.

(30) Foreign Application Priority Data

Nov. 9, 1998 (AU) .................................. PP7020

(51) Int. Cl.
  B41J 2/215 (2006.01)
  B41J 2/045 (2006.01)
  B41J 11/58 (2006.01)
(52) U.S. Cl. ..................... 347/83; 347/54; 347/68; 347/84; 400/625
(58) Field of Classification Search ............... 400/625; 347/83, 84, 54, 68
  See application file for complete search history.

(56) References Cited

U.S. PATENT DOCUMENTS

| 4,904,100 | A |   | 2/1990  | Enix |  |
| 5,240,238 | A |   | 8/1993  | Lee |  |
| 5,393,152 | A |   | 2/1995  | Hattori et al. |  |
| 5,419,543 | A |   | 5/1995  | Nakamura et al. |  |
| 5,462,375 | A |   | 10/1995 | Isobe et al. |  |
| 5,475,279 | A | * | 12/1995 | Takeuchi et al. ............ | 310/331 |
| 5,493,409 | A |   | 2/1996  | Maeda et al. |  |
| 5,559,932 | A |   | 9/1996  | Machida et al. |  |
| 5,608,437 | A | * | 3/1997  | Iwata et al. .................... | 347/86 |
| 5,621,445 | A | * | 4/1997  | Fong et al. .................... | 347/87 |
| 5,946,007 | A | * | 8/1999  | Otsuka et al. ................ | 347/23 |
| 5,949,458 | A | * | 9/1999  | Studholme .................... | 347/86 |
| 5,971,533 | A |   | 10/1999 | Kinoshita et al. |  |
| 5,971,641 | A |   | 10/1999 | Looney |  |
| 6,081,284 | A | * | 6/2000  | Tosaka et al. ................ | 347/87 |
| 6,149,256 | A | * | 11/2000 | McIntyre et al. .............. | 347/2 |
| 6,270,271 | B1|   | 8/2001  | Fujiwara |  |
| 6,402,308 | B1| * | 6/2002  | Hattori et al. ................ | 347/86 |

(Continued)

FOREIGN PATENT DOCUMENTS

JP    09 113990    5/1997

(Continued)

*Primary Examiner*—Andrew H. Hirshfeld
*Assistant Examiner*—Marvin P. Crenshaw

(57) ABSTRACT

A print media and ink supply cartridge includes a base molding and a cover molding between which there is located a deformable film. Ink is stored in a deformable volume between the deformable film and the cover molding. A number of ink outlet nozzles, which communicate with the deformable volume are formed into the cover molding whereas air inlets are formed into the base molding. Pierceable seals cover the ink nozzles and are pierced upon coupling of the cartridge to a printer. The cartridge is arranged so that the nozzles are located clear of the cartridge's print media housing in order that the nozzles are readily accessible to the printer.

6 Claims, 11 Drawing Sheets

U.S. PATENT DOCUMENTS

| | | |
|---|---|---|
| 6,565,196 B1 * | 5/2003 | Matsuo et al. ............... 347/68 |
| 6,577,818 B1 | 6/2003 | Hirano |
| 6,854,836 B1 * | 2/2005 | Ishinaga et al. ............. 347/85 |
| 2005/0104941 A1 * | 5/2005 | Tanaka ...................... 347/70 |

FOREIGN PATENT DOCUMENTS

| | | |
|---|---|---|
| WO | WO 97/04353 | 2/1997 |
| WO | WO 97/50243 | 12/1997 |

* cited by examiner

PRINT MEDIA AND INK SUPPLY CARTRIDGE

CROSS REFERENCE TO RELATED APPLICATIONS

This Application is a Continuation Application of U.S. Ser. No. 10/713,058, filed on Nov. 17, 2003, which is a Continuation Application of U.S. Ser. No. 09/436,508, filed on Nov. 9, 1999, now Issued U.S. Pat. No. 6,626,529.

FIELD OF THE INVENTION

The present invention relates to print media supply cartridges for printers.

The invention has been developed primarily for use as a combined paper and ink supply cartridge and will be described hereinafter with reference to this particular preferred form. However, it will be appreciated that the inventive concept is applicable to all print media cartridges including those without an integral ink supply.

SUMMARY OF THE INVENTION

According to the invention there is provided a digital cartridge for a printing device, the cartridge including a casing having:

a first portion for housing therein a supply of print media;
a print media exit opening; and
an integral media transport mechanism disposed upon operation to pick up and drive an amount of said print media through said exit opening.

In the preferred form, the cartridge includes a second storage portion for housing therein a supply of ink.

Desirably, the print media transport mechanism comprises a pick up roller assembly and more particularly includes:

a drive shaft;
pick up rollers secured to the drive shaft; and
a drive gear, the shaft and rollers being captively supported within the casing.

Preferably the drive gear is positioned to be external to the casing to engage a powered corresponding gear provided on the printing device with which it is to be used. Alternatively an opening may be provided in the casing to facilitate this engagement with the powered gear of the printer device.

Desirably, the ink storage portion is segregated into a plurality of distinct chambers for storing a supply of different colored inks.

Preferably, the ink is stored within the second ink storage portion in a collapsible bladder. The bladder may be in the form of a fully flexible sealed bag which locates within an external rigid casing. More preferably, the ink can be stored within a region defined on one side by a rigid portion of the casing to which has been sealed a collapsible membrane which defines the other side. Desirably, at least a portion of the rigid housing adjacent the side of the collapsible membrane or bag that is not in fluid communication with the ink, includes vent means to facilitate ingress of air to allow the membrane to collapse as the ink supply is consumed.

In the preferred form, the ink storage portion also includes one or more ink outlets each having a seal which is pierceable upon connection with the printing device. Desirably, these outlets are in the form of nozzle connections adapted for attachment with an ink distribution connection provided on the printer.

Preferably, the digital printing device is a drop-on-demand ink jet printing device.

BRIEF DESCRIPTION OF THE DRAWINGS

A preferred embodiment of the invention will now be described, by way of example only, with reference to the accompanying drawings in which.

DESCRIPTION OF THE PREFERRED AND OTHER EMBODIMENTS

Figure 1:
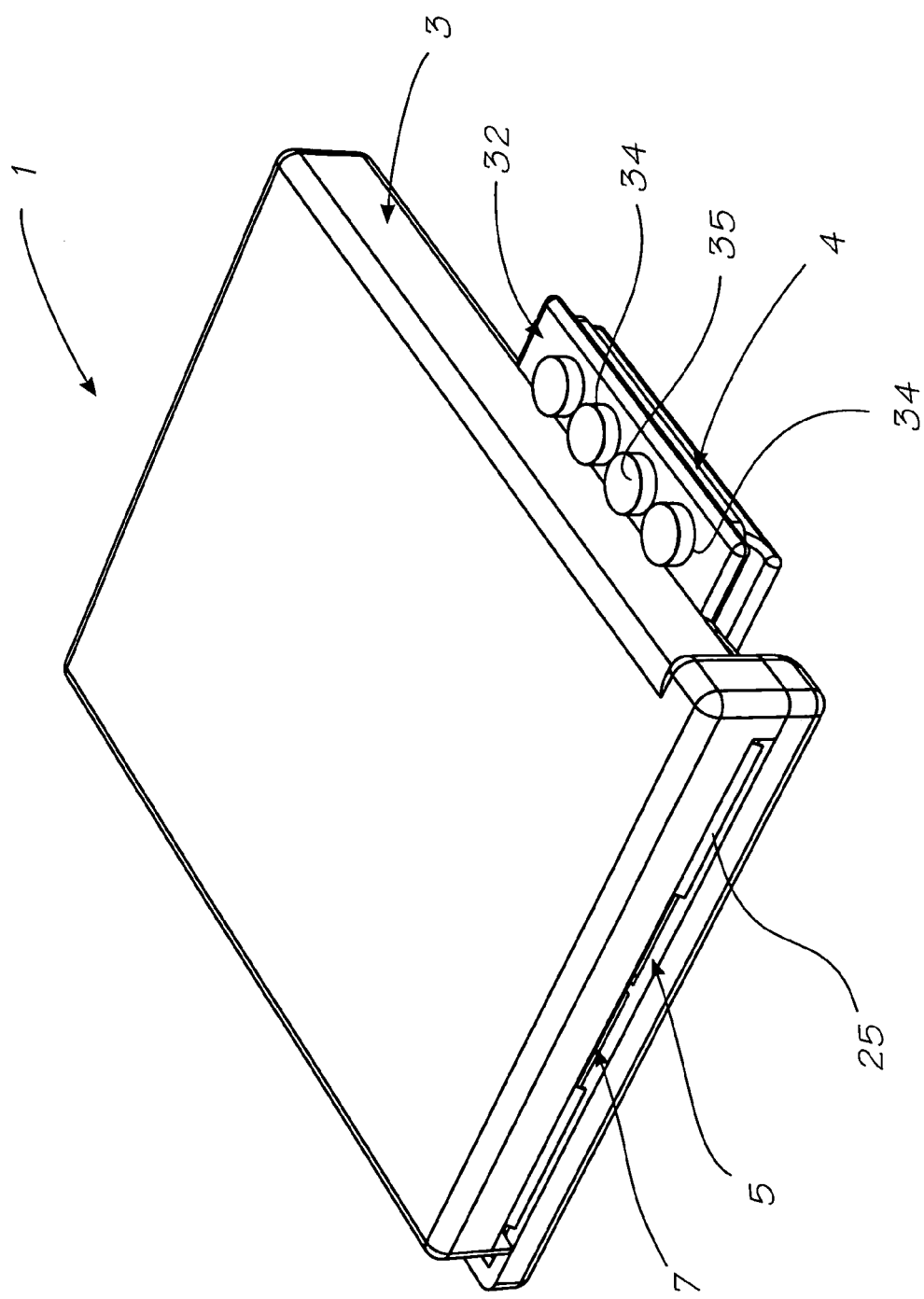
FIG. 1 is a top perspective view of a cartridge in accordance with the invention.
Figure 2:
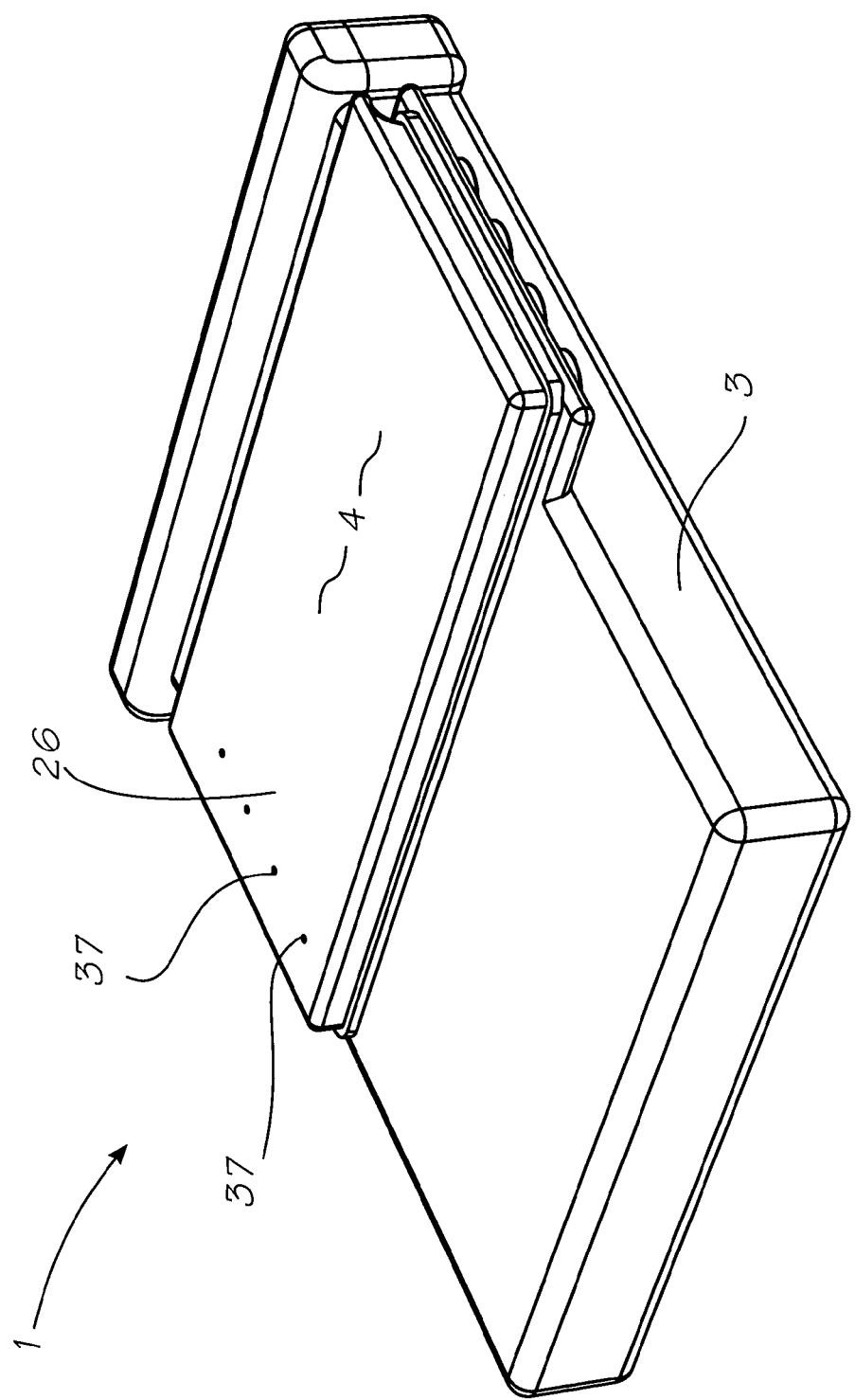
FIG. 2 is an inverted perspective view of the cartridge shown in FIG. 1.
Figure 3:
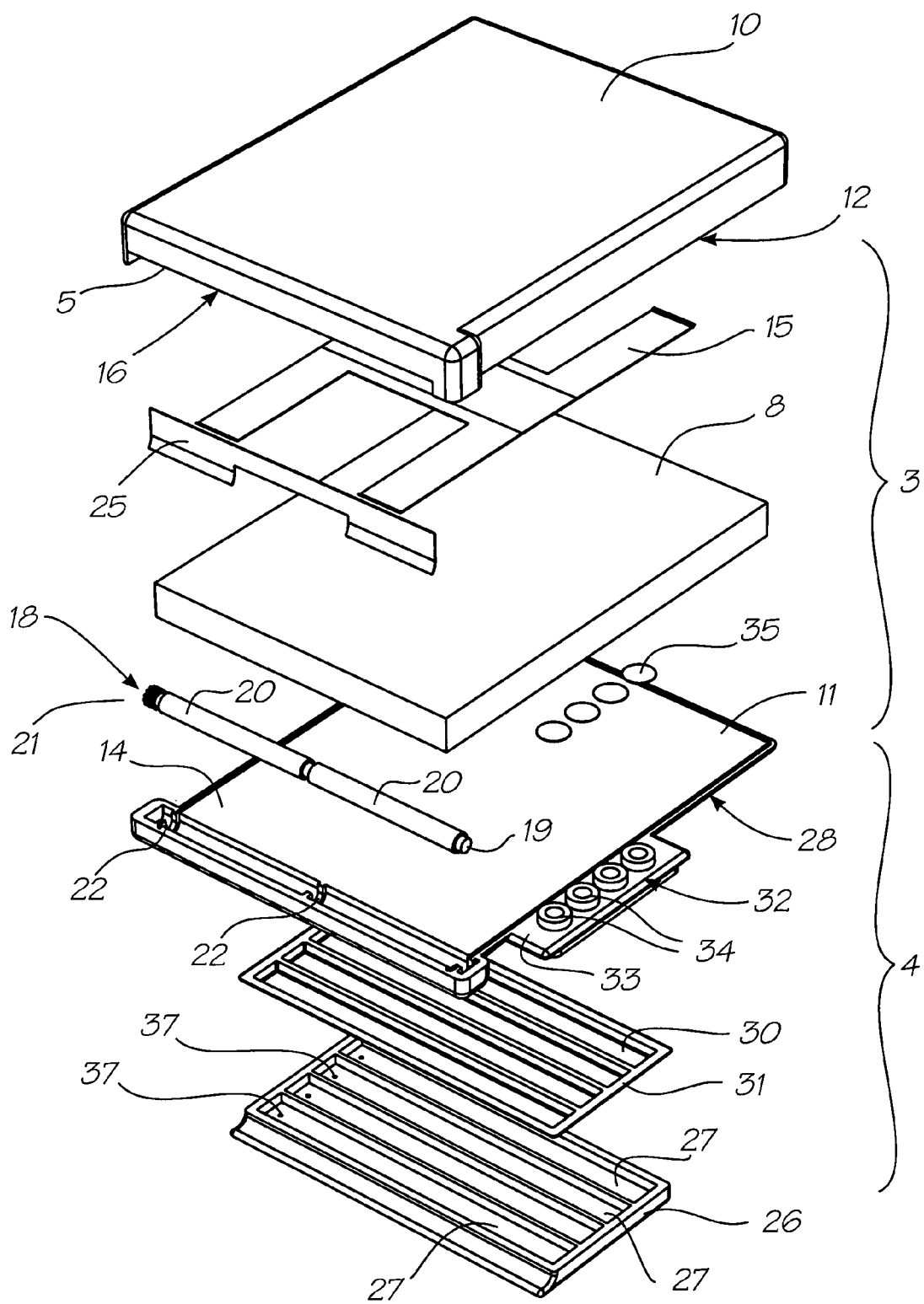
FIG. 3 is an exploded perspective top view shown in the same orientation as that shown in FIG. 1.
Figure 4:
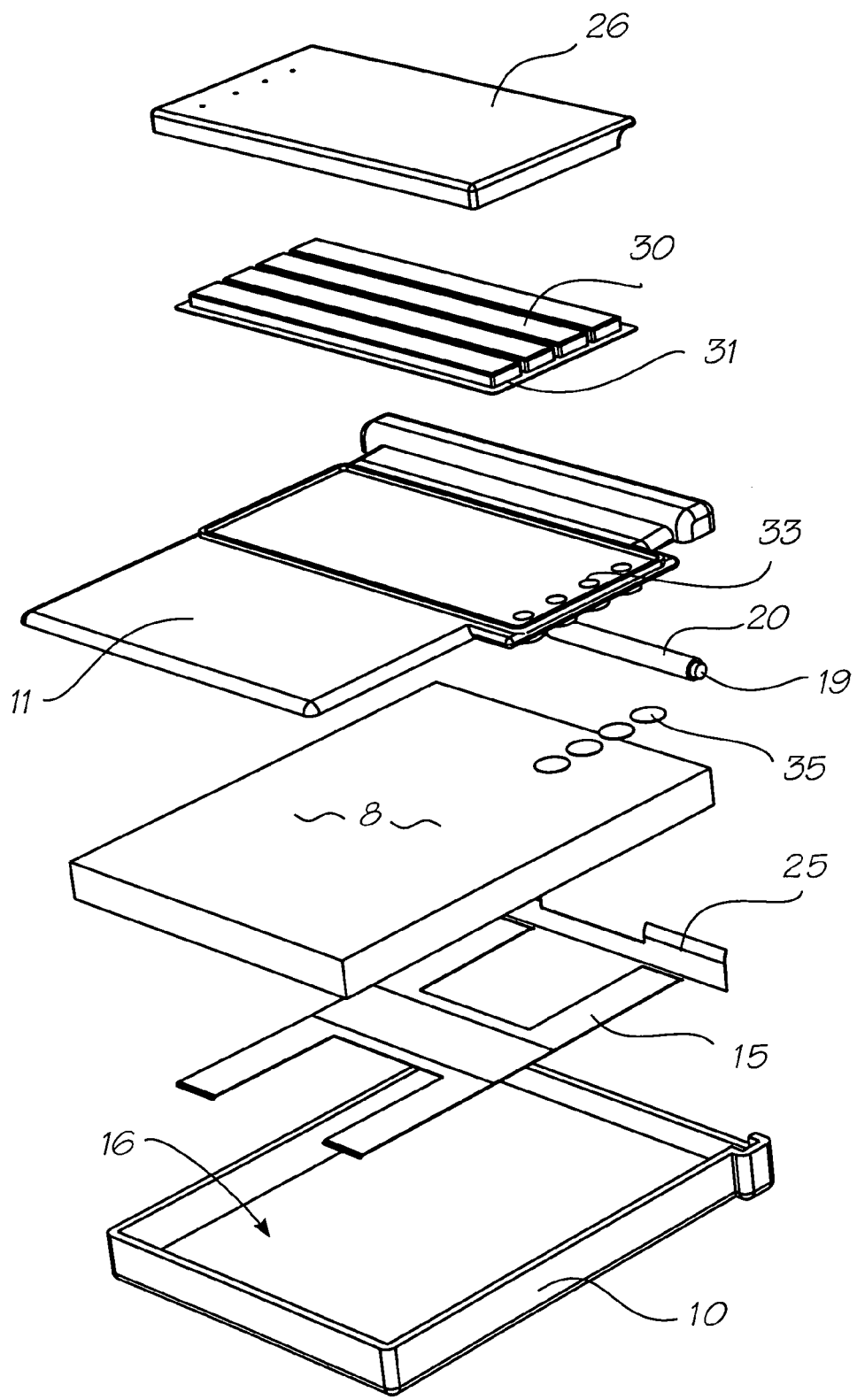
FIG. 4 is an exploded inverted perspective view shown in the same orientation as FIG. 2.
Figure 5:
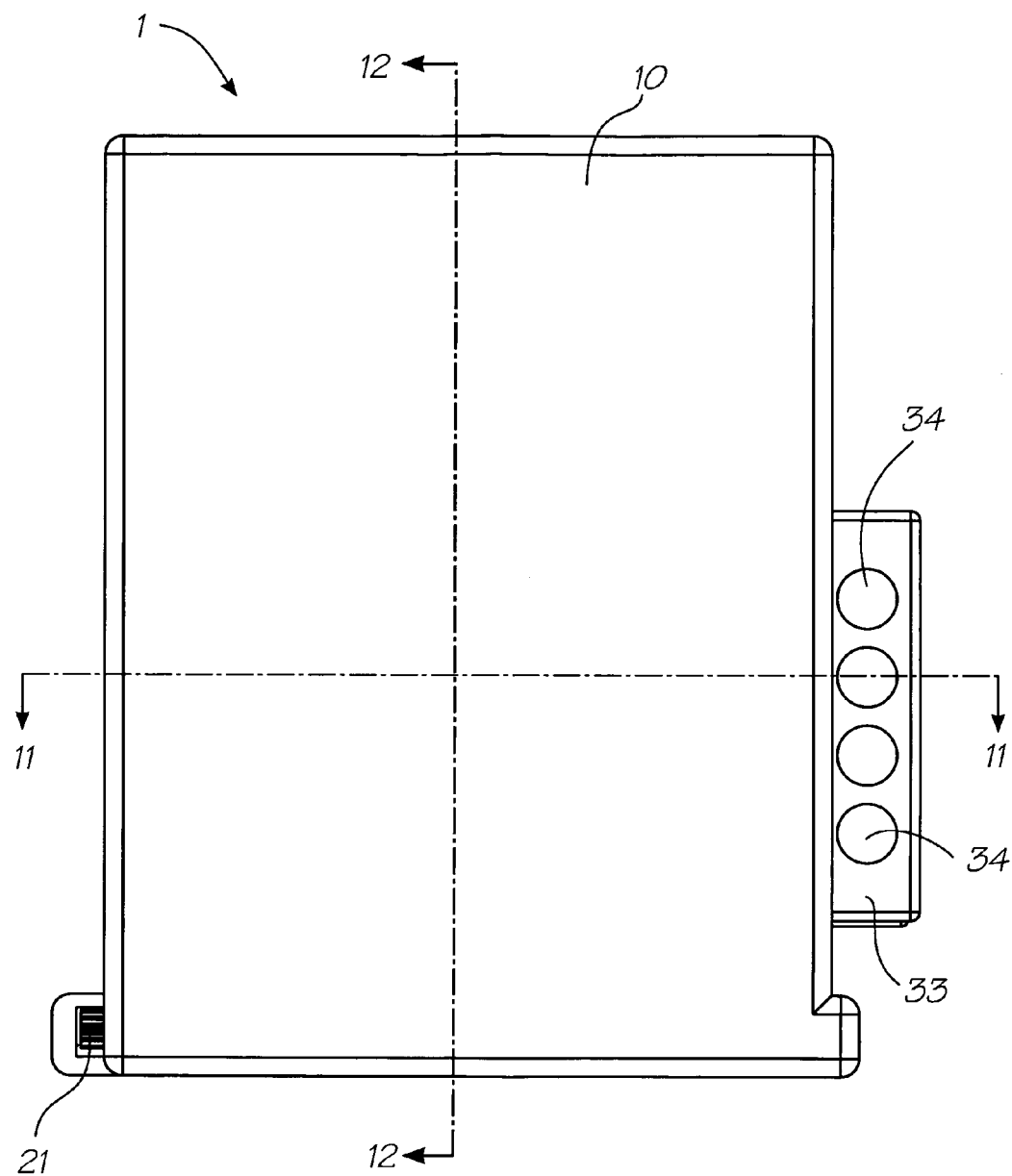
FIG. 5 is a top plan view of the cartridge of the previous figures.
Figure 6:
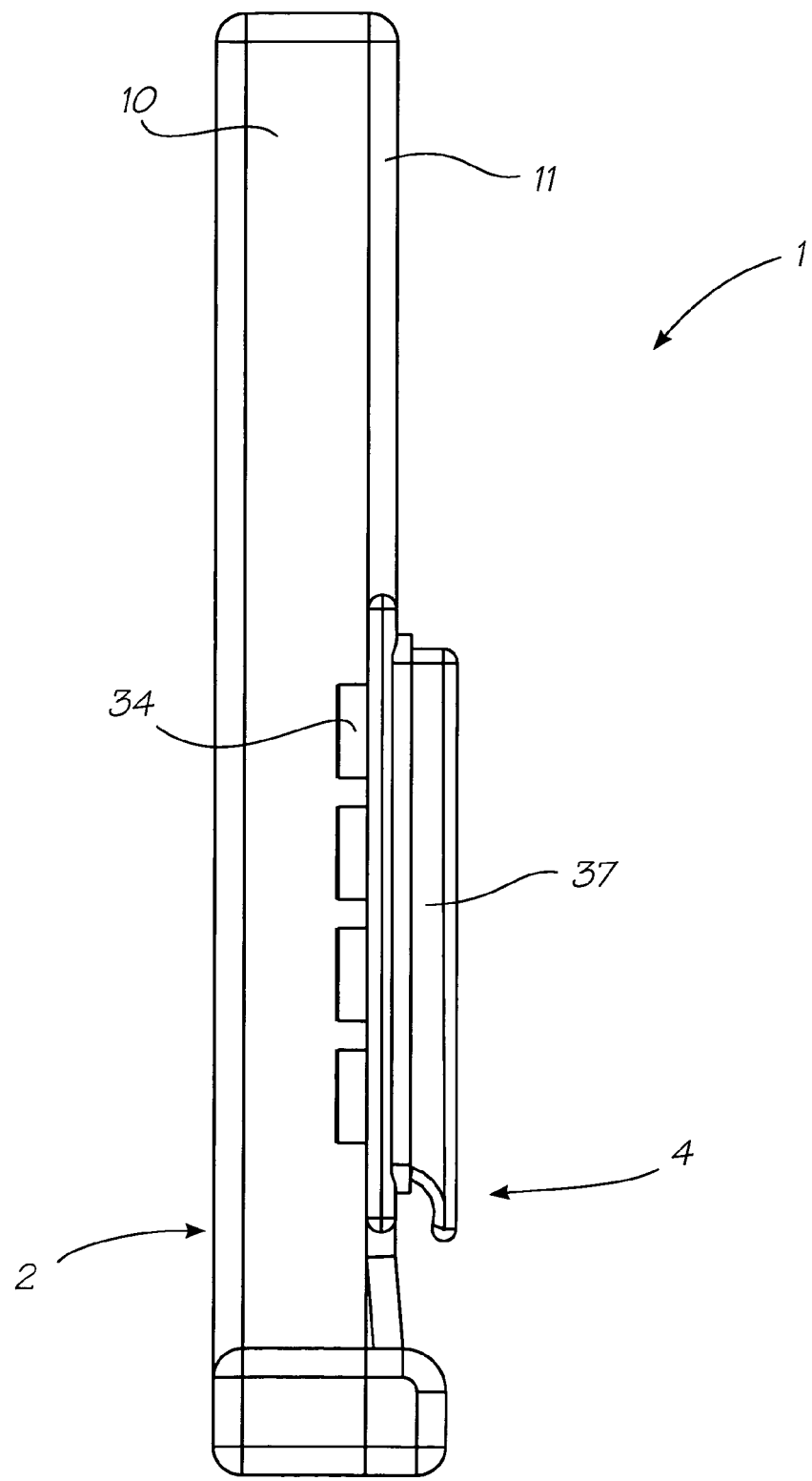
FIG. 6 is a right hand side view of the cartridge shown in FIG. 5.
Figure 7:
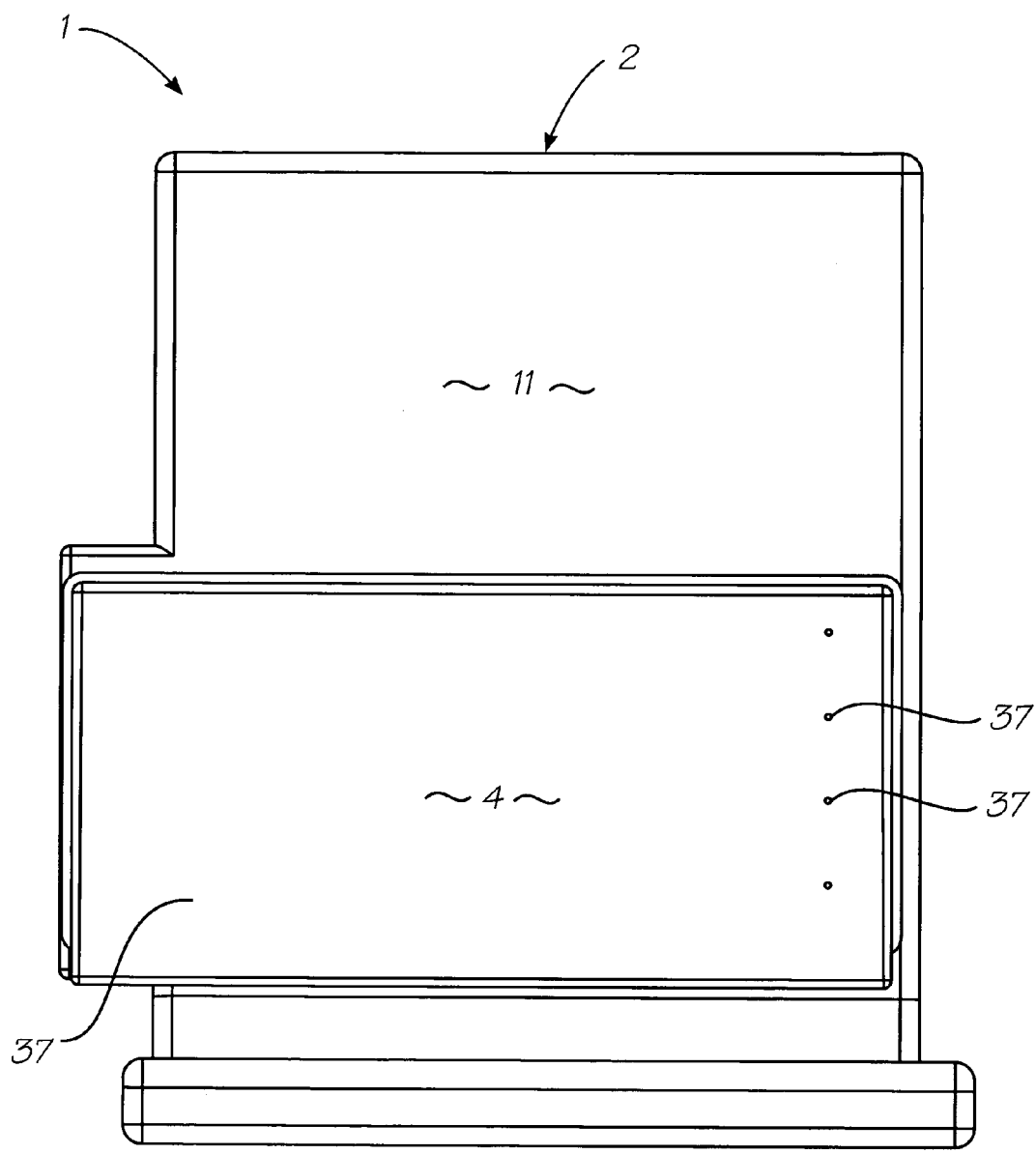
FIG. 7 is an inverted plan view of the cartridge of the previous figures.
Figure 8:
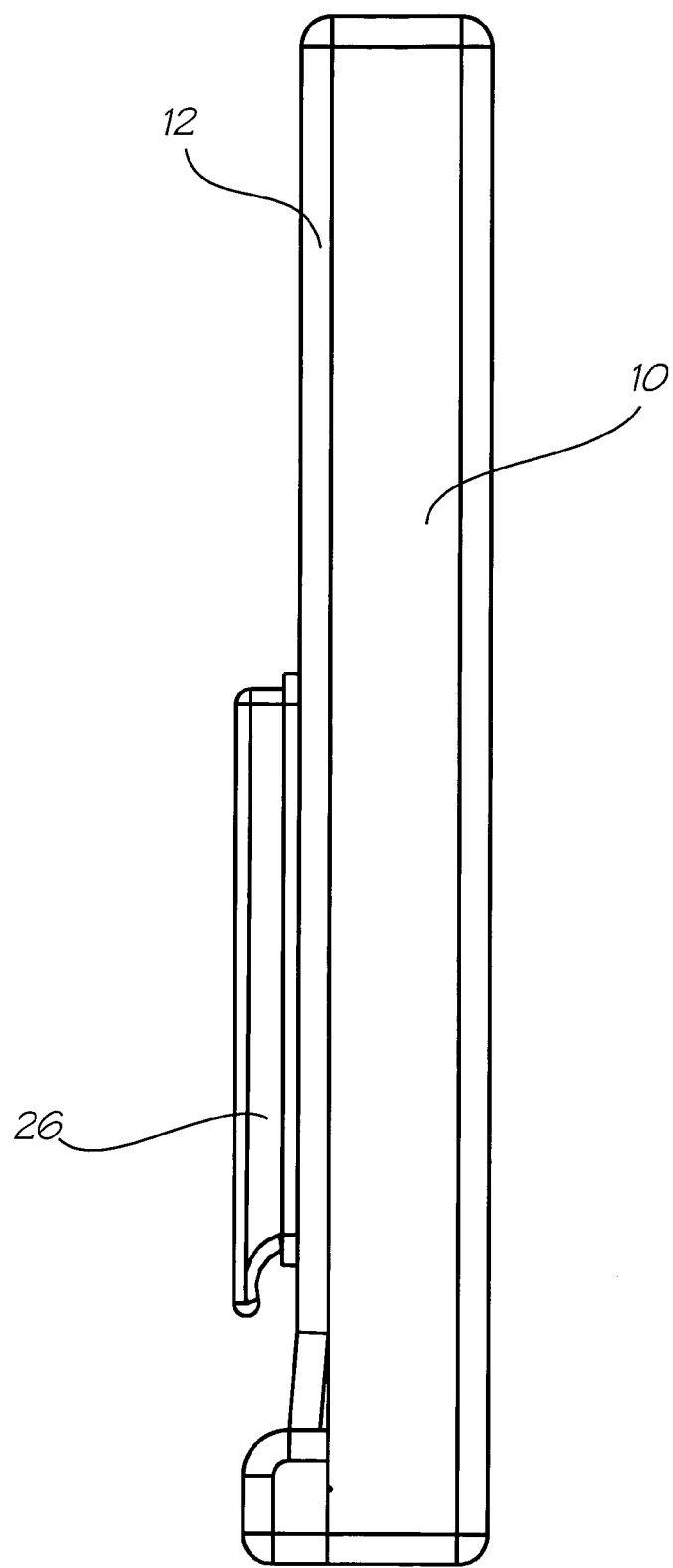
FIG. 8 is a left hand side view of the same cartridge.
Figure 9:
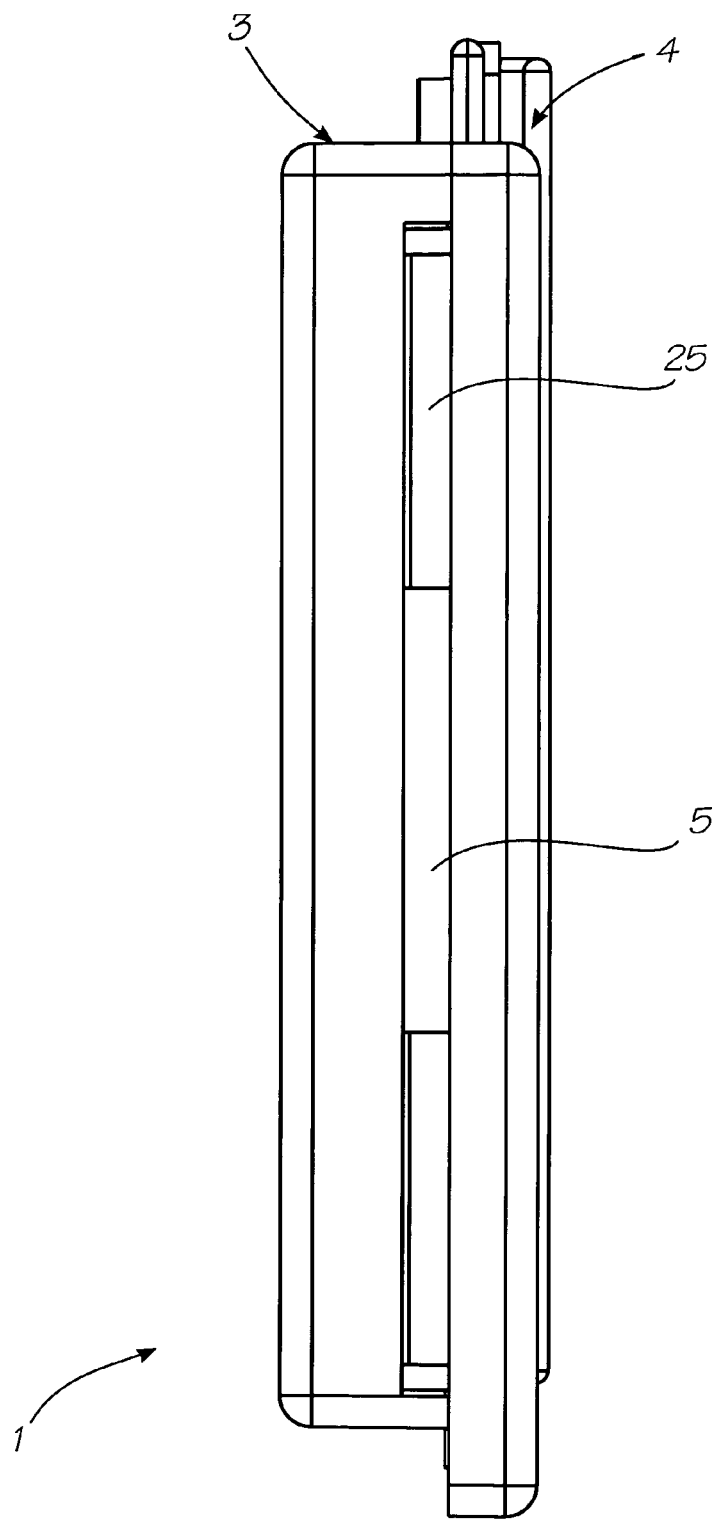
FIG. 9 is a front view of the same cartridge.
Figure 10:
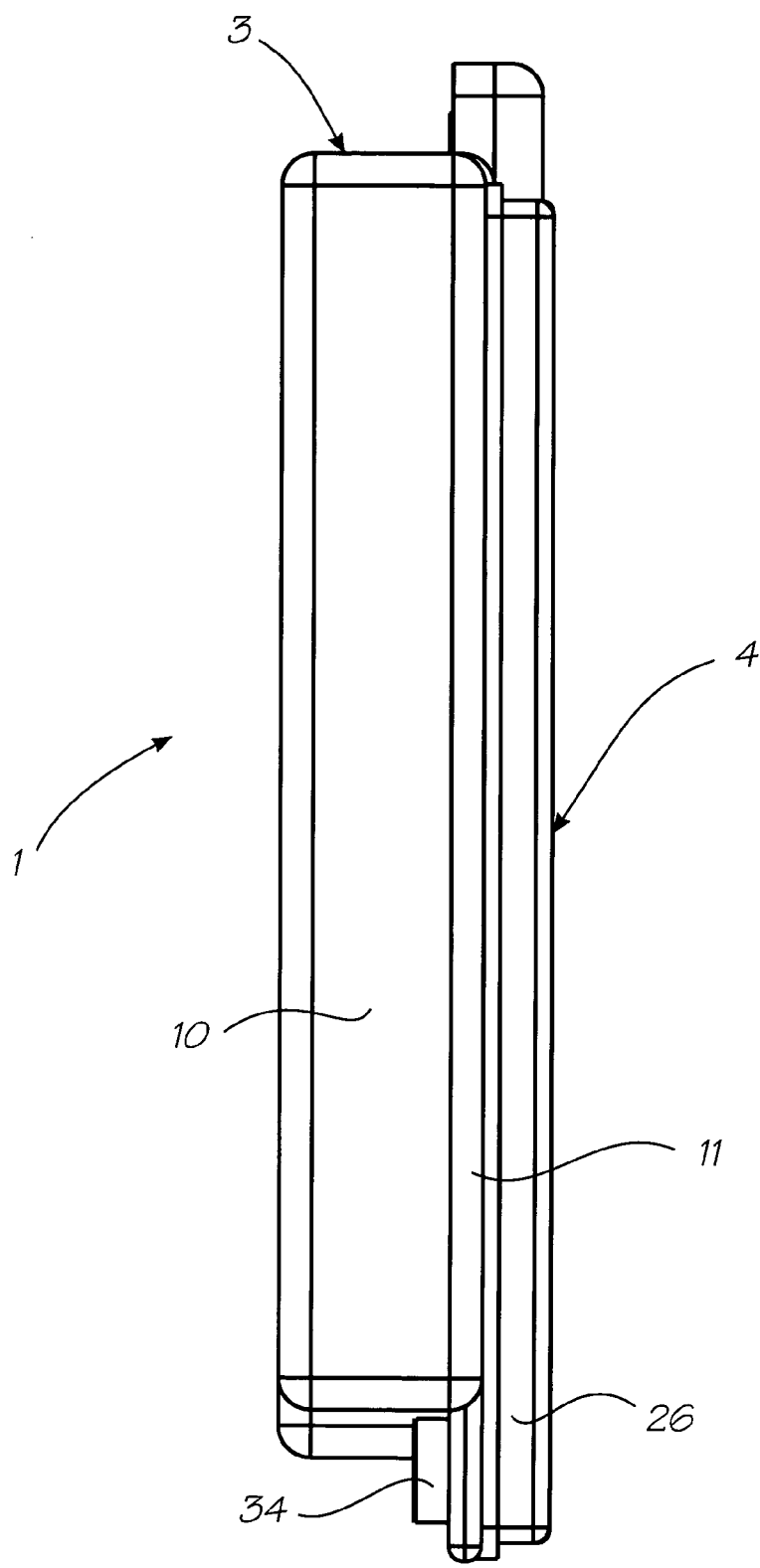
FIG. 10 is a rear view of the same cartridge.
Figure 11:
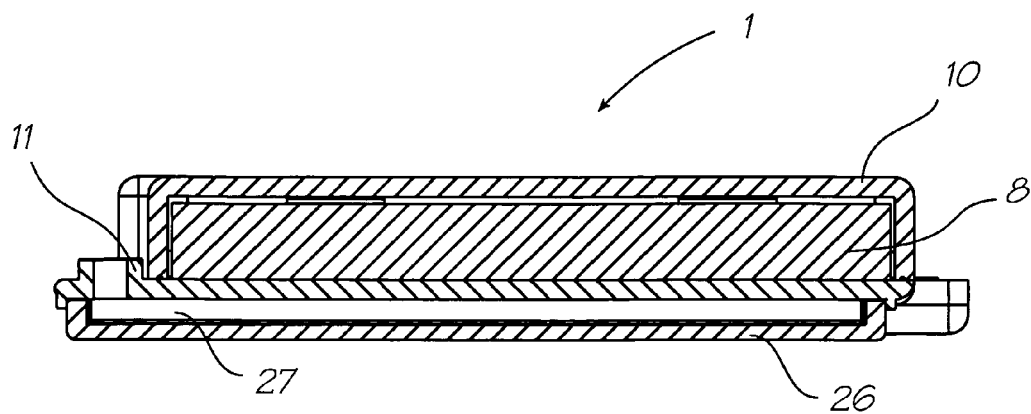
FIG. 11 is a sectional rear view taken on line 11—11 of FIG. 5.
Figure 12:
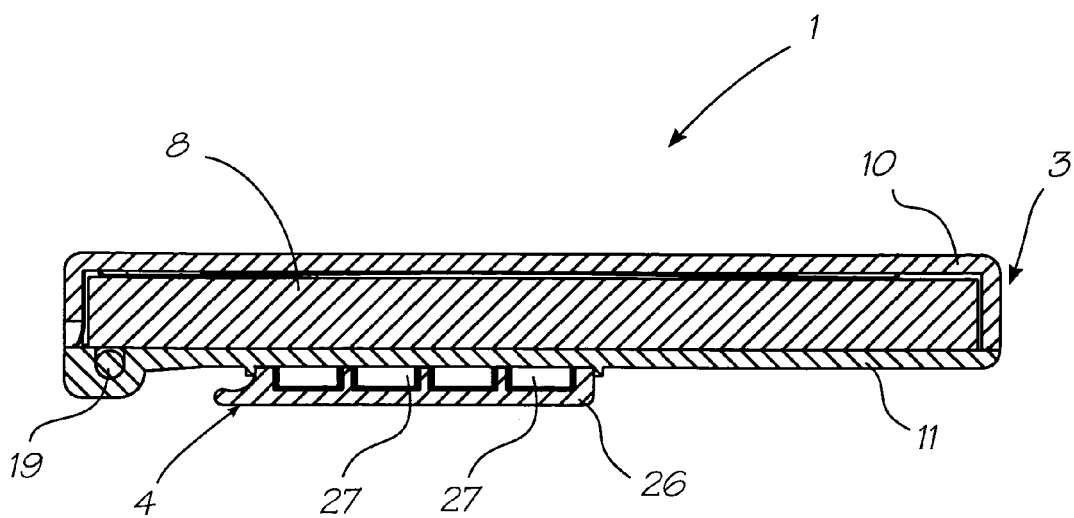
FIG. 12 is a sectional side view taken on line 12—12 of FIG. 5.

Referring to the drawings, there is shown a cartridge 1 for a printing device including a casing shown generally at 2. In the illustrated preferred form, the casing is divided into two main portions comprising, a print media supply portion 3 for housing sheets of paper and the like, and a second storage portion 4 for housing an ink supply. This cartridge is designed for use with digital printing devices, and is particularly suitable for drop-on-demand ink jet-printing devices.

The casing 2 also defines a print media exit opening 5 that connects with the print media storage portion 3 and a print media transport mechanism shown generally at 7. This transport mechanism is disposed within the print media housing portion 3 adjacent the print media exit 5, such that upon operation it picks up and drives the print media 8 out through the print media exit opening.

Turning first to consider the elements of the print media storage portion of the cartridge, it can be seen to comprise a media top molding 10 which mates with a corresponding bottom molding 11. In this manner the moldings combine to define a generally rectangular print media storage region 12 in which is housed print media in the form of a stack of paper sheets or cards.

The top and bottom moldings 10 and 11 are both configured at a front end to define, in combination, the print media exit opening 5. In use, the stack of cards 8 are disposed within the storage region 12. These are biased downwardly toward engagement with an upper surface 14 of the bottom molding 11 by means of thin metal springs 15 which bear against an inner lower surface 16 of the top molding 10.

The print media transport mechanism of the preferred form illustrated is in the form of a geared pick up roller assembly 18. This assembly includes a drive shaft 19, pick up rollers 20 that are rigidly secured to the drive shaft, and an external drive gear 21.

The transport assembly 18 is captively retained within the casing portion formed by the top and bottom print media moldings, the drive shaft 19 being rotatably supported by means of arcuate ribs 22 formed in a channel 23 located beneath the exit opening 5. The top molding fully encloses the portion of the drive shaft holding the pick up rollers 20, but leaves the external drive gear 21 exposed as shown. In an alternate form, the drive gear may be accessed via an opening in the casing for engagement with a corresponding powered roller on the printer device. A plastic or metal foil 25 is also provided adjacent the exit opening 5. This foil is sized to extend downwardly across the exit such that once the transport mechanism is operated, only a single sheet of paper or card is driven through the exit at any one time.

The ink storage portion 4 is similarly defined by two separate moldings forming part of the cartridge casing. The primary molding is the ink storage base molding 26 which is configured to define a plurality of distinct ink chambers 27. Ultimately, the chambers are sealed by direct or indirect connection of this base molding 26 to a cover molding, which in this preferred form is provided by an underside 28 of the print media storage bottom molding 11.

In the preferred form shown, the connection of the two moldings is indirect, as there is provided an intermediate thin walled deformable film 30 which is preferably initially contoured to nest within the ink chambers 27 defined in the base molding 26. During assembly, the base molding 26 is sealingly connected with a flange 31 provided around the periphery of the thin walled deformable film 30 which in turn is sealingly connected with the underside 28 of the print media storage bottom molding 11.

As can be seen from the drawings, the ink chambers base molding 27 preferably extends beyond the peripheral edge of the print media storage region above, so as to define an ink supply connection manifold region 32. The upper portion of the manifold 32 is formed as an extension 33 of the print media storage bottom molding 11 and includes thereon a plurality of ink connection nozzles 34 which are closed by means of pierceable ink seals 35. In use the ink is stored above the deformable film and is thereby in fluid communication with the ink connection nozzles 34. In order to facilitate collapsing of the deformable film 30 as the ink is withdrawn, air vents 37 are provided in the ink storage base molding 26, preferably at the end remote from the ink nozzles. The various components of the cartridge casing can be assembled by any suitable means including use of adhesives, ultrasonic welding or mechanical fasteners or the like.

A preferred application of the cartridge of the invention as hereinbefore described is for use in a video games console having an integral printer of the kind described in Australian provisional patent application PP7020 and corresponding U.S. application entitled "A video game console with integral printer device" filed concurrently herewith, the contents of which are incorporated herein by reference.

In use, the cartridge of the invention is inserted into an appropriately configured printer device whereby the drive gear 21 aligns with and engages a corresponding driven gear provided on the printer mechanism. The advantages of this configuration are numerous. Most importantly, the provision of the transportation means within the cartridge, ensures that the paper or other print media is fed out of the cartridge accurately and with minimum initial contamination, as the mechanism and print media are housed within an enclosed unit. In cartridges of the prior art, the cartridge is pressed onto a pick up roller mounted in the printer device, which exposes the paper on the underside. By contrast, the present design allows for greater structural integrity as there is no need to provide an opening that exposes the print media to that same extent. Further, the design provides for a tamper proof unit.

Additional advantages relating to the preferred forms include the provision of seals over the ink outlet nozzles that are pierceable automatically by the printer mechanism upon loading. In this regard, the cartridge is intended only as a single use product. Additionally, the structure of the ink chamber molding whereby the deformable film and base can be molded or joined in a simultaneous operation to form a completely sealed ink chamber, clearly offers manufacturing cost and efficiency advantages.

It will be appreciated by those skilled in the art that whilst the invention has been described with reference to a specific example, the concept can be embodied in many other forms. For example, the print media transport mechanism need not be limited to a pick up roller mechanism, but could include any other suitable mechanisms which can be externally driven from outside the cartridge casing. Similarly, the means of storage of the ink is not limited to the form described and could include the use of other deformable or non-deformable storage means. Accordingly, the preferred embodiment described should be considered in all respects to be illustrative and not restrictive.

We claim:

1. A print media and ink supply cartridge including;
   an ink chamber base molding;
   an ink chamber cover molding, the base molding and cover molding together defining a plurality of separate ink chambers;
   a deformable member disposed between the base molding and top molding, the deformable member including a deformable wall for each of said ink chambers, the deformable wall dividing each ink chamber thereby defining a deformable first volume and a deformable second volume, the first volume providing a deformable ink storage volume for each ink chamber;
   for each ink chamber, one or more outlets from said ink storage volume; and
   for each ink chamber, one or more air inlets into said second volume.

2. A print media and ink supply cartridge according to claim 1, wherein the one or more outlets comprise nozzles formed in the cover molding.

3. A print media and ink supply cartridge according to claim 2, including pierceable ink seals located to seal the nozzles.

4. A print media and ink supply cartridge according to claim 2, wherein a region of the cover molding supporting the nozzles extends beyond a paper storage portion of said cartridge.

5. A print media and ink supply cartridge according to claim 1, wherein the ink chamber base molding, ink chamber cover molding and the deformable member are configured to provide a number of distinct ink chambers to store different inks.

6. A print media and ink storage cartridge according to claim 1 wherein said deformable member is retained by and between said base molding and said cover molding.

* * * * *